United States Patent Office 3,386,844
Patented June 4, 1968

3,386,844
ALUMINUM FLAKE PIGMENT COMPOSITION
Rolf Rolles, Apollo, and Kenneth E. Luyk, Lower Burrell, Pa., assignors to Aluminum Company of America, Pittsburgh, Pa., a corporation of Pennsylvania
No Drawing. Filed Feb. 21, 1966, Ser. No. 528,829
3 Claims. (Cl. 106—290)

ABSTRACT OF THE DISCLOSURE

Aluminum flake pigments for and in admixture with compatible vehicles in the production of dried paint films have been found to be superior to chemical spotting attack on exposure to industrial atmospheres and tree sap deposits when the purity of the aluminum flake pigmentation thereof is controlled within specified limits.

---

This invention relates to metallic compositions of aluminum flake pigments for admixture with compatible vehicles in the production of protective paint formulations characterized in their dry or set condition by superior resistance to chemically corrosive spotting or staining on exposure to industrial atmospheres, sap deposits from fruit and/or other varieties of sap-producing trees, and similar corrosive-producing environments.

Aluminum flake pigments herein contemplated have been successfully produced from atomized and/or shredded foil by ball-milling slurries consisting of charges of the starting aluminum stock in steel ball mills in the presence of a conventional lubricant and volatilizable hydrocarbon solvent, the ball mill being periodically interrupted, its slurry charge discharged therefrom separated from its steel balls, screened and filtered, and adjusted with fresh volatilizable hydrocarbon solvent, if necessary, to provide commercially acceptable lubricant-coated aluminum flake paste pigments, or if desired, the pastes so produced may be vacuumized to provide dry powder flake pigments bearing a lubricant on the flake surfaces thereof.

The present invention is founded on our discovery that the purity of the initial aluminum starting stock and amount and type of elemental metallic components normally present in the starting aluminum, as well as elemental metallic component pick-up during fabrication of aluminum flake pigments falling within the scope of the invention, are of extreme significance and importance when measured in terms of the chemical resistance or non-staining characteristics of dried paint films incorporating such aluminum flake pigments. Furthermore, we have determined that it is not the degree of purity alone of the aluminum starting stock that is determinative of the chemical staining propensity of an eventual dry paint film incorporating aluminum flake pigments having metallic compositions satisfying the invention, but that the components in addition to the element aluminum, in amount and kind, regardless of their origin, have a direct bearing on the control, quality and performance of aluminum flake pigments falling within the scope of the present invention.

It is therefore a primary object of the invention to provide a superior flake pigment of a composition of relatively high purity aluminum, with controlled amounts of one or more included specified elements, exhibiting superior and improved anti-spotting or stain-resisting properties in dried paint films incorporating the same.

Other objects and advantages will become apparent to those skilled in the art to which the invention appertains on consideration of the following disclosure.

Several months of laboratory controlled research, development and testing has established that consistently reproducible and improved chemically resistant non-spotting aluminum pigmented paint, or similar coating formulations, can be provided when the composition of the aluminum flakes of the pigments incorporated therein are selected with a minimum aluminum purity of 99.9 percent by weight and the balance consists essentially of 0.001 to 0.1 percent by weight of at least one of the metallic elements gallium, silicon, iron, copper, zinc and manganese. In this connection, the elements gallium, silicon and iron have been found, on analytical analysis, to be usually present, singly or in combination, in the initial high purity aluminum starting stock, whereas the elements copper, zinc and manganese have been traced in many instances to the equipment employed in production of the aluminum flake pigments of the invention.

Origin of the latter three elements is believed to be attributable to pick-up from the hardened steel liners of the ball mills and steel balls conventionally employed in disintegrating the initial charge, whether it be an atomized product or shredded aluminum foil stock. These same elements have also been traced to pick-up in some degree to conventional atomizing equipment, when the initial stock is so produced for the subsequent conventionally practiced ball-milling step.

Table I herein includes a selected representative group of fifteen different aluminum flake paste pigments, having analytically determined aluminum flake compositions, employed in the development of the present invention.

TABLE I

| Specimen Aluminum Flake Paste Pigments | | Percent By Weight Elemental Metallic Composition of Aluminum Flakes in Paste Pigments | | | | | | |
|---|---|---|---|---|---|---|---|---|
| No. | Identification | Al | Ga | Si | Fe | Cu | Zn | Mn |
| 1 | ARL-56 | 99.644 | 0.017 | 0.087 | 0.234 | 0.010 | 0.003 | 0.005 |
| 2 | 226 (Control) | 99.776 | 0.013 | 0.076 | 0.115 | 0.005 | 0.013 | 0.002 |
| 3 | 226 (Control) | 99.776 | 0.013 | 0.076 | 0.115 | 0.005 | 0.013 | 0.002 |
| 4 | XB-1992 | 99.801 | 0.011 | 0.059 | 0.109 | 0.005 | 0.012 | 0.003 |
| 5 | ARL-69 | 99.947 | 0.003 | 0.012 | 0.022 | 0.010 | 0.003 | 0.003 |
| 6 | XB-1967 | 99.967 | 0.002 | 0.009 | 0.016 | 0.002 | 0.002 | 0.002 |
| 7 | XB-1963 | 99.954 | 0.003 | 0.034 | 0.002 | 0.002 | 0.003 | 0.002 |
| 8 | S-824 (Control) | 99.970 | 0.002 | 0.012 | 0.009 | 0.002 | 0.003 | 0.002 |
| 9 | XB-1999 | 99.965 | 0.017 | 0.003 | 0.001 | 0.014 | 0.000 | 0.000 |
| 10 | 726 | 99.973 | 0.003 | 0.017 | 0.003 | 0.002 | 0.002 | 0.000 |
| 11 | XB-1996 | 99.979 | 0.002 | 0.003 | 0.001 | 0.015 | 0.000 | 0.000 |
| 12 | S-824 (Control) | 99.970 | 0.002 | 0.012 | 0.009 | 0.002 | 0.003 | 0.002 |
| 13 | 726 | 99.972 | 0.003 | 0.013 | 0.008 | 0.002 | 0.002 | 0.000 |
| 14 | XB-1997 | 99.909 | 0.003 | 0.085 | 0.003 | 0.000 | 0.000 | 0.000 |
| 15 | 726 | 99.976 | 0.003 | 0.011 | 0.005 | 0.002 | 0.003 | 0.000 |
| 16 | XB-1995 | 99.989 | 0.002 | 0.008 | 0.001 | 0.000 | 0.000 | 0.000 |
| 17 | XB-1998 | 99.979 | 0.017 | 0.003 | 0.001 | 0.000 | 0.000 | 0.000 |

The pastes in the extreme left hand column, under the heading "Specimen" in Table I, were produced from atomized aluminum starting stock in a steel ball mill charged with slurries of starting stocks in admixture with a conventional lubricant, steel balls and volatile hydrocarbon solvent. The ball mill was operated in the production of each of the specimen charges, and indicated control charges, for from 5 to 16 hours, the comminuted products discharged therefrom separated from the steel balls, and the remaining slurries screened, filtered and adjusted with clean volatile hydrocarbon solvent, if required, to produce the listed aluminum paste flake pigments having compositions by weight 35 to 80 percent metal flakes, 0.3 to 10 percent lubricant on the flakes and in the solvent, and 20 to 64 percent hydrocarbon solvent. Portions of each of the specimen pastes listed in Table I were vacuumized to produce dry aluminum flakes, the lubricant removed from the surfaces thereof and the flakes chemically and quantitatively analyzed as disclosed in the elemental metallic flake composition section of Table I. The lubricant before removal from the surfaces of the vacuumized dried flakes was found to be present in amounts between 0.3 to 3 percent, based on metal weight.

Coating or paint formulations were prepared by adding portions of each of the aluminum flake paste pigments listed in Table I to a thermosetting acrylic resin vehicle, containing a melamine resin solution and phthalocyanine blue color-imparting pigment to the following composition:

| | Percent amount |
|---|---|
| Aluminum flake pigment paste (65% non-volatile) | 2.23 |
| Phthalocyanine blue | .07 |
| Thermosetting acrylic resin (50% non-volatile) | 47.49 |
| Melamine resin (50% non-volatile) | 24.83 |
| Volatile hydrocarbon solvent (xylol) | 25.38 |
| | 100.00 |

Each of the paint formulations so prepared was coated on duplicate aluminum panels and force dried at 250° F. for 35 minutes.

A three inch diameter filter paper, soaked in a 10 percent by volume hydrochloric acid (HCl) solution, was applied to one each of the duplicate painted panels and maintained in contact therewith for a period of 10 minutes, after which the filter paper was removed and a pool of the 10 percent by volume HCl solution was applied on the circular area of each panel exposed by removal of each wetted filter paper and the deposited pool covered with a watch glass for a period of six hours. Visual and instrumentally determined diffuse luminous reflectance measurements were recorded for all of the panels. The instrumentally determined reflectance measurements were obtained using a conventional Dual-Purpose, Colorimeter and Abridged Spectro-Photometer Instrument known commercially as a Large Sphere Color-Eye, Model LSD-1 instrument, supplied by Instrument Development Laboratories, of Attleboro, Mass.

Table II herein includes the results of the diffuse luminous reflectance measurements of the dried paint films on the duplicate painted panels above referred to and identified in terms of and in the same order as the aluminum flake paste pigment specimens incorporated therein and listed in Table I. The paint coatings were also visually ranked.

TABLE II

| Dried Paint Films Incorporating Paste Pigments | Visual Ranking | Diffuse Luminous Reflectance Measurements—Instrumental G Readings | | $\Delta G$ Difference | Mathematically Calculated $(\Delta G - 0.6)^2$ | Equation Calculated $(\Delta G - 0.6)^2$ |
|---|---|---|---|---|---|---|
| | | Original | HCl Treated | | | |
| 1 | 17 | 35.55 | 32.75 | −2.80 | 11.55 | 11.55 |
| 2 | 14 | 41.45 | 39.06 | −2.39 | 8.94 | 7.93 |
| 3 | 15 | 41.65 | 39.28 | −2.37 | 8.82 | 7.93 |
| 4 | 16 | 43.63 | 41.88 | −1.75 | 5.47 | 7.57 |
| 5 | 13 | 36.13 | 35.10 | −1.03 | 2.66 | 2.30 |
| 6 | 11 | 40.69 | 39.83 | −0.86 | 2.13 | 1.22 |
| 7 | 10 | 39.66 | 38.91 | −0.75 | 1.82 | 1.17 |
| 8 | 8 | 39.76 | 39.26 | −0.50 | 1.21 | 1.18 |
| 9 | 12 | 41.82 | 41.72 | −0.10 | 0.25 | 0.51 |
| 10 | 7 | 38.30 | 38.27 | −0.03 | 0.40 | 0.31 |
| 11 | 9 | 41.93 | 41.93 | 0 | 0.36 | 0.29 |
| 12 | 6 | 40.21 | 40.24 | +0.03 | 0.32 | 1.18 |
| 13 | 5 | 40.07 | 40.31 | +0.24 | 0.13 | 0.45 |
| 14 | 4 | 41.93 | 42.26 | +0.33 | 0.07 | 0.54 |
| 15 | 3 | 40.05 | 40.44 | +0.39 | 0.04 | 0.51 |
| 16 | 2 | 41.81 | 42.31 | +0.50 | 0.01 | −0.34 |
| 17 | 1 | 42.88 | 43.45 | +0.57 | 0.00 | −0.13 |

Table II establishes substantially close agreement or correlation between the visually ranked and instrumentally determined diffuse luminous reflectance numerical differences recorded for the dried paint films incorporating the aluminum flake pigments of Table I.

The numerical values in column $\Delta G$ of Table II report the differences between the instrumentally determined diffuse luminous reflectance numerical values for the original or untreated and HCl treated dried paint films reported in the previous two columns of the table. The elemental metal flake compositions from Table I, excluding the element aluminum, and corresponding instrumentally and mathematically determined numerical values listed in the column of Table II identified "Mathematically Calculated $(\Delta G - 0.6)^2$" were programmed into a computer and a numerical relationship established therebetween expressed in the form of the equation:

$$(\Delta G - 0.6)^2 = -0.5 + 17.41 \text{ (percent by weight Ga)}$$
$$+ 10.30 \text{ (percent by weight Si)}$$
$$+ 36.31 \text{ (percent by weight Fe)}$$
$$+ 45.75 \text{ (percent by weight Cu)}$$
$$+ 190.4 \text{ (percent by weight Zn)}$$
$$+ 266.3 \text{ (percent by weight Mn)}$$

The analytical composition values for the six metallic elements, other than aluminum, in each of the flake compositions of Table I were substituted in the right hand side of the computerized determined equation $(\Delta G - 0.6)^2$ and the results are recorded in the last or right hand column of Table II, where it will be observed close agreement exists between both of the differently determined values reported in the adjacent $(\Delta G - 0.6)^2$ columns of Table II.

The laboratory prepared and tested aluminum flake pigments and the reported results recorded in Tables I and II clearly establish that the flake compositions of specimens 5 through 17, characterized by a numerical value <3 for the expression $(\Delta G - 0.6)^2$, not only conform to the aforesaid computerized equation, but also satisfy the superior non-staining characteristics of dried paint films incorporating aluminum flake pigments, and the elemental metallic compositions thereof, falling within the scope of the invention.

An approved acid-staining test, accepted by the automotive industry, and comprising evaporation of droplets of a 0.5 percent by volume solution of HCl applied on the surfaces of identically painted aluminum panels to those reported in Table II, was also carried out and visual ranking of the spotted surfaces established complete agreement with the test results reported in Table II.

Related laboratory investigation has also established that other conventional vehicles, normally employed in the aluminum paint industry and compatible with aluminum flake pigmentation, perform with entire satisfaction in the practice of the present invention. Examples of compatible vehicles substitutable for the specific thermosetting acrylic vehicle referred to above are the thermoplastic acrylic and alkyd resin vehicles, and coating formulations or paints prepared therefrom and incorporating the pigment flake compositions of the invention have performed with equal non-staining success.

In regard to the lubricants essential to conventional manufacture of aluminum flake pigments satisfying the invention, at least one of the leafing and/or non-leafing lubricants selected from the group consisting of stearic, palmitic, myristic, lauric, ricinoleic, behenic, arachidic and oleic acids, as well as trihydrogenated tallow amine, has functioned and performed with equal satisfaction. In the research and development program reported herein, the lubricants lauric and stearic acids, and trihydrogenerated tallow amine were employed.

Inclusion or absence of color-imparting pigments, conventional driers and/or conventional paint additives, has in no way detracted from the success and superiority of the herein established elemental metallic composition for aluminum flake pigments of the invention.

Whereas a selected number of pigment compositions were selected to illustrate the present invention, it will be appreciated that the invention may be otherwise embodied, represented and presented within the scope of the invention, as defined in the appended claims.

What we claim is:

1. An aluminum flake product for admixture with compatible vehicles in the production of dried metallic film coatings characterized by substantial freedom from chemically corrosive spotting, said aluminum flake product having an elemental metallic composition by weight of minimum 99.9 percent aluminum and the balance consisting essentially of at least one of the elements gallium, silicon, iron, zinc, copper and manganese in total amount between .001 to 0.1 percent, the said six named elements being present in individual amounts determinative by the equation:

$$(\Delta G - 0.6)^2 = -0.5 + 17.41 \text{ (percent by weight Ga)}$$
$$+ 10.30 \text{ (percent by weight Si)}$$
$$+ 36.31 \text{ (percent by weight Fe)}$$
$$+ 45.75 \text{ (percent by weight Cu)}$$
$$+ 190.4 \text{ (percent by weight Zn)}$$
$$+ 266.3 \text{ (percent by weight Mn)}$$

where $(\Delta G - 0.6)^2 < 3$, and $\Delta G$ is a numerical value defining the difference between diffuse luminous reflectance measurements for a dried film incorporating the aluminum flake product before and after six hours exposure to 10 percent by volume HCl solution.

2. A metallic flake pigment having the elemental metallic composition in accordance with claim 1 and having 0.3 to 3.0 percent by weight lubricant on the flake surfaces thereof.

3. A paint formulation comprising an aluminum flake pigment in admixture with a compatible vehicle, dried film coatings of the paint being characterized by substantial freedom from chemically corrosive spotting, said aluminum flake pigment having an elemental metallic composition by weight of minimum 99.9 percent aluminum, and the balance consisting essentially of at least one of the elements gallium, silicon, iron, zinc, copper and manganese in total amount between .001 to 0.1 percent, the said six named elements being present in individual amounts determinative by the equation:

$$(\Delta G - 0.6)^2 = -0.5 + 17.41 \text{ (percent by weight Ga)}$$
$$+ 10.30 \text{ (percent by weight Si)}$$
$$+ 36.31 \text{ (percent by weight Fe)}$$
$$+ 45.75 \text{ (percent by weight Cu)}$$
$$+ 190.4 \text{ (percent by weight Zn)}$$
$$+ 266.3 \text{ (percent by weight Mn)}$$

where $(\Delta G - 0.6)^2 < 3$, and $\Delta G$ is a numerical value defining the difference between diffuse luminous reflectance measurements for a dried film coating incorporating the aluminum flake pigment before and after six hours exposure to 10 percent by volume HCl solution, and said metallic flake pigment having 0.3 to 3.0 percent lubricant on the flake surfaces based on metallic pigment weight in this paint.

References Cited

UNITED STATES PATENTS

| | | | |
|---|---|---|---|
| 2,522,538 | 9/1950 | Rethwisch et al. | 106—290 |
| 2,886,432 | 5/1959 | Schmitt et al. | 75—138 |
| 2,941,894 | 6/1960 | McAdow | 106—291 |
| 2,980,638 | 4/1961 | Polovina | 106—290 |
| 3,303,019 | 2/1967 | Jacobs | 75—68 |

TOBIAS E. LEVOW, *Primary Examiner.*

JAMES E. POER, *Examiner.*